United States Patent [19]
Wilkinson

[11] 3,769,571
[45] Oct. 30, 1973

[54] POWER INVERTER CIRCUIT
[75] Inventor: Bruce L. Wilkinson, Torrance, Calif.
[73] Assignee: Pioneer Magnetics, Inc., Santa Monica, Calif.
[22] Filed: Mar. 21, 1973
[21] Appl. No.: 343,509

[52] U.S. Cl............... 321/45 R, 307/64, 307/75, 307/82, 321/27 R
[51] Int. Cl. ............................................ H02m 7/52
[58] Field of Search ................. 307/58, 64, 66, 75, 307/82; 321/27, 45 R

[56] References Cited
UNITED STATES PATENTS
| | | | |
|---|---|---|---|
| 3,328,664 | 6/1967 | Baude | 321/27 MS |
| 3,343,067 | 9/1967 | Mesenhimer | 307/82 X |
| 3,424,995 | 1/1969 | Parente | 331/49 |
| 3,668,509 | 6/1972 | Riebs et al. | 321/18 |

Primary Examiner—William M. Shoop, Jr.
Attorney—Keith D. Beecher et al.

[57] ABSTRACT

A power supply is provided which is capable of operation from either of two power sources, such as on normal power from the usual alternating-current mains, or emergency power from a stand-by battery; and which will automatically switch from one source to another as the need arises. The power supply includes a transformer having at least two primary windings, and first and second input circuits respectively connected to the two primary windings and to the two sources. The preferred source will be selected by the power supply so long as its voltage is equal to or greater than the voltage of the secondary source.

10 Claims, 4 Drawing Figures 3,769,571

POWER INVERTER CIRCUIT

BACKGROUND OF THE INVENTION

Power inverter circuits are known to the art, and they serve to transform either direct-current voltages or alternating-current voltages into secondary alternating-current voltages which may be rectified to provide direct-current output voltages of different values than the input voltages. Such circuits often employ transistor switches to connect the primary winding of a transformer across a direct-current source. The transistor switches cause the direct-current voltage from the source to be cyclically reversed as applied to the primary winding of the transformer so as to produce an alternating-current in that winding. If the source is an alternating-current voltage source, the voltage from that source is first rectified before it is switched to the primary winding of the transformer. The alternating-current produced in the output circuit may be used directly, or it may be rectified to produce a direct-current output voltage of different value than the input voltage.

It is often desired to construct a power supply, of the power inverter type, for example, which is capable of operation on either of two voltage sources. For example, such power supplies have been constructed which will operate on normal power from the usual 115-volt 60 hertz alternating-current mains, and which will also operate on power from a direct-current battery. Moreover, it is often desirable to effect a transfer of input from one of the aforesaid sources to the other without interruption of the output power from the power supply.

For example, when such a power supply is used to activate a computer, it is often essential for the computer operation to be uninterrupted, even briefly, should the alternating-current source fail. The power supply of the present invention finds particular utility to such an application since it is capable of automatically switching its operation from the alternating-current source to a direct-current battery in the event of loss of alternating-current input power, and of activating the switching function without any interruption of its output power.

The system of the invention comprises a high-frequency power inverter with two or more input circuits, and which is constructed to draw input power from a preferred power source, such as the usual alternating-current mains, as long as power from that source is available; and which will automatically switch to a second auxiliary power source should the preferred source fail.

DETAILED DESCRIPTION OF THE ILLUSTRATED EMBODIMENT

Figure 1:
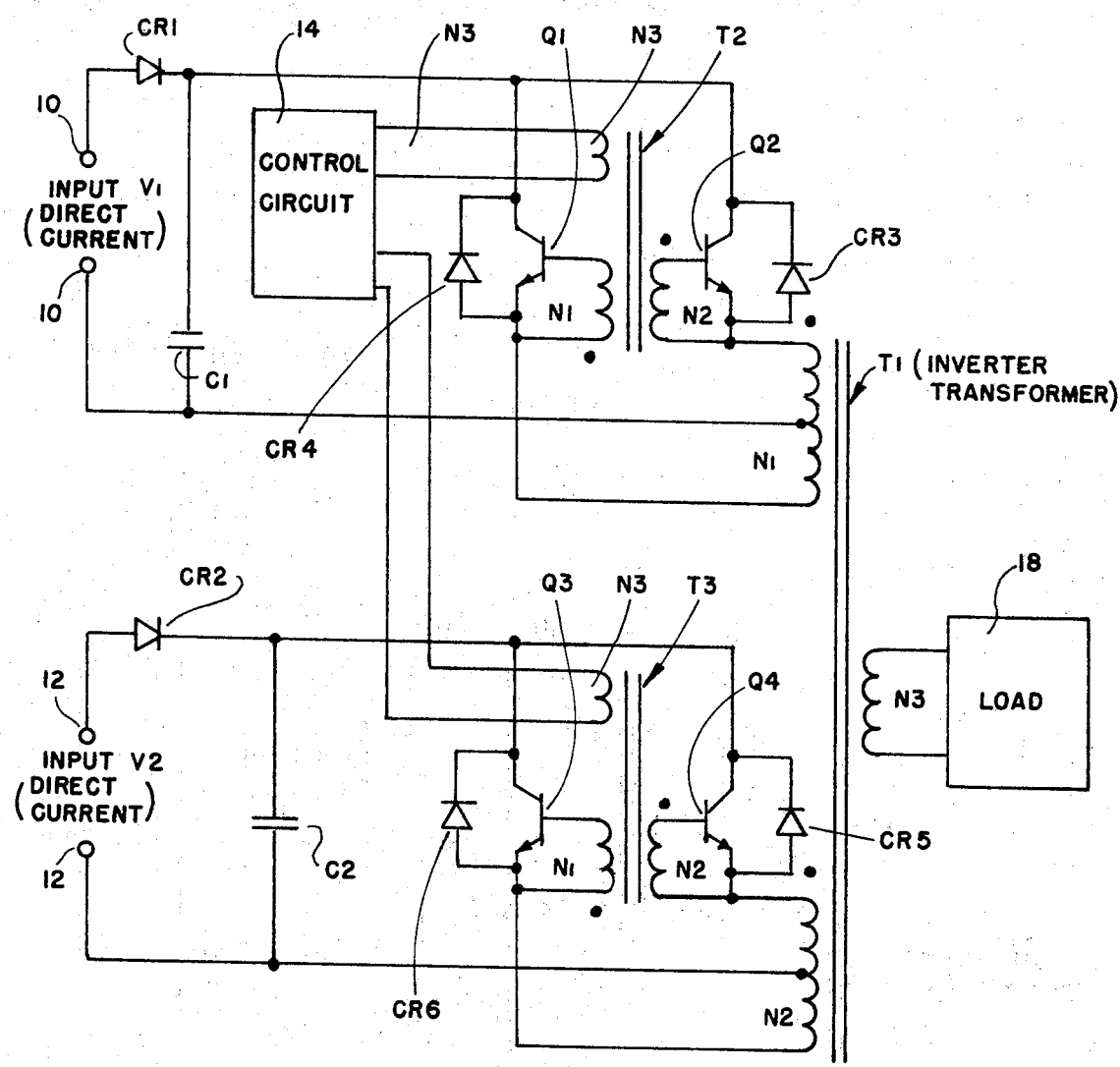
FIG. 1 is a circuit diagram of an inverter circuit constructed in accordance with the present invention, and which is energized by two separate direct-current power sources.

The inverter of FIG. 1 includes a first pair of input terminals 10 which are connected to a first direct-current source, and a second pair of input terminals 12 which are connected to a second direct-durrent source. One of the input terminals 10 is connected to a diode designated CR1 which, in turn, is connected to the collector of an NPN transistor Q1. A capacitor C1 is connected to the cathode of the diode CR1 and to the other terminal 10. The other terminal 10 is also connected to the center of the primary winding N1 of a transformer T1. One side of the primary winding is connected to the emitter of the transistor Q1, and the other side of the primary winding is connected to the emitter of a second NPN transistor Q2. The NPN transistor Q2 is shunted by a diode CR3, and its collector is connected to the collector of the transistor Q1.

The base of the transistor Q1 is connected to one side of a winding N1 of a transformer T2, the other side of which is connected to the emitter of the transistor. The transistor Q1 is shunted by a diode CR4. A second winding N2 of the transformer T2 is connected to the base of the transistor Q2 and to its emitter. The emitter of the transistor Q2 is connected to one side of the winding N1 of the transformer T1, and the emitter of the transistor Q1 is connected to the other side of that winding.

The input terminals 12 are connected to a second circuit similar to that described above, and which is composed of a diode CR2, a capacitor C2, a transformer T3, and a second primary winding N2 of the transformer T1. The second circuit includes a pair of NPN transistors Q3 and Q4. A control circuit designated by a a block 14 is connected to a third winding N3 of the transformer T3. The transformer T1 has a secondary winding N3 which is connected to a appropriate load 18.

It will be observed that the inverter transformer T1 of FIG. 1 has two separate primary windings N1 and N2, one for each input source; and the inverter also includes two sets of switching transistors Q1, Q2 and Q3, Q4, one set for each primary winding. The switching transistors Q1, Q2 and Q3, Q4 are transformer driven synchronously by the common control circuit 14 which establishes the duty cycle and phase relationship of the switching transistors. The control circuit 14 may vary the duty cycle to regulate the output voltage of the inverter, as is well known to the inverter art. The inverter output voltage derived across the secondary winding N3 of the transformer T1 is an alternating-current voltage which may be rectified and filtered, if so desired. There may, of course, be more than one output winding for the inverter transformer T1.

The turns ratio of the primary windings N1 and N2 of the inverter transformer T1 is chosen to be slightly less than the ratio of the input voltages V1 and V2, derived respectively from the two direct-current sources, assuming that the input V1 is preferred input. If both inputs V1 and V2 are present, then the voltage developed across the primary winding N1 of the transformer T1 must be at least equal to the voltage at the input V1, and primary current will flow in the winding N1 of the inverter transformer T1 to support the load 18. The voltage across the primary winding N2 of the transformer T1 will be greater than the voltage at input V2 because:

$$N1/N2 < V1/V2$$

and therefore $$VN1/VN2 < V1/V2$$

but, $$VN1 = V1$$

so, $$VN1/VN2 < VN1/V2$$

and therefore $$VN2 > V2$$

Since the voltage across the winding N2 of the inverter transformer T1 is greater than the input voltage V2, the blocking diode CR2 will be reverse biased and will not conduct. Therefore, there will be no current drawn from the input V2. In this mode of operation, the inverter is operating on the preferred input V1, and no current is drawn from the alternate input source V2. In the event that the input V1 fails, or diminishes in amplitude, the relationship :

$$VN1/VN2 > V1/V2$$

will apply, and since $V_{N2}$ must be at least as great as V2, $$VN1 > V1$$

and so the blocking diode CR1 will be reverse biased, and will not conduct, so that the inverter will operate on the input V2.

If the control circuit 14 adjusts the duty cycle of the inverter to maintain a constant average output voltage, then the inverter has the capability of making an automatic transfer from input V1 to input V2 in the event that input V1 becomes unable to support the load. If the duty cycle of the inverter is controlled to produce a constant average output voltage, commonly called a pulse width modulated inverter, then input current will be drawn in pulses, and the capacitors C1 and C2 are used to filter these pulses so that the electrical noise will not be conducted into the main power source.

The capacitor which is associated with the input that is not providing power, as, for example, input V2, when input V1 is present, is kept charged to a voltage greater than the associated input voltage, because the diodes CR3, CR4 or CR5, CR6 connected from the collector to the emitter of each of the activated switching transistors act as rectifiers and charge the corresponding capacitors C1 or C2 to the voltage which is generated by the corresponding winding N1 or N2 of the inverter transformer T1.

Figure 2:
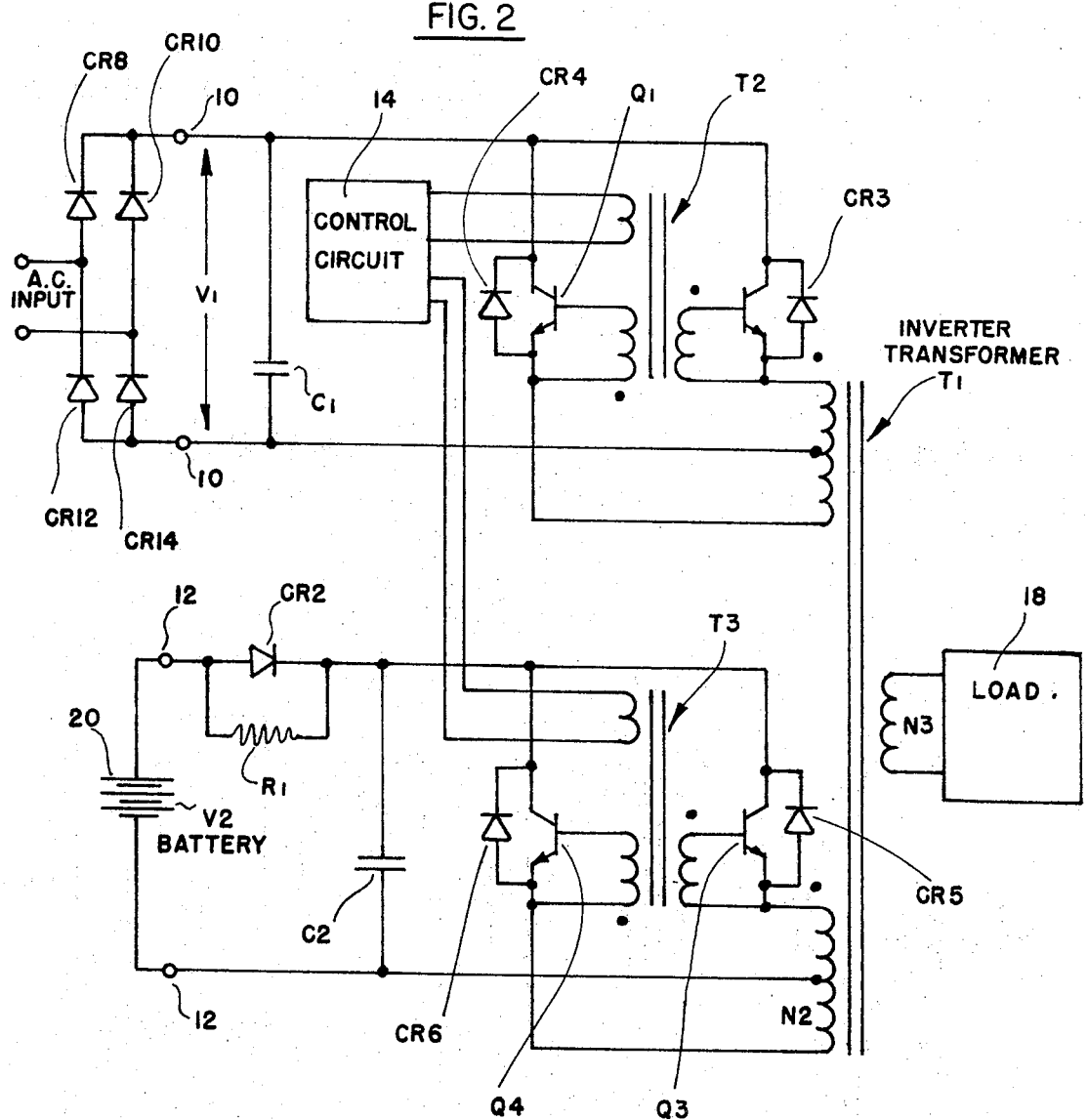
FIG. 2 is a circuit, similar to the circuit of FIG. 1, but in which the inverter is modified to draw power from either an alternating-current source, or a direct-current battery.

The circuit of FIG. 2 is generally similar to that of FIG. 1, and like components have been designated by the same numbers. The circuit of FIG. 2 is modified to permit the V1 input to be an alternating-current source, such as the 115-volt 60 hertz, and the V2 input to be a battery 20, and to provide a means for charging the battery 20 when the alternating-current input power is available.

In the circuit of FIG. 2, the diodes CR8, CR10, CR12 and CR14 are connected as a bridge rectifier which rectifies the input alternating-current from the associated alternating-current power source, so as to produce a direct-current voltage V1 across the capacitor C1.

The bridge rectifier also serves the same function as the blocking diode CR1 in the circuit of FIG. 1, so that the alternating-current input may fall to a low value, and the capacitor C1 will remain charged due to the action of the inverter, as described above.

In the battery circuit, the blocking diode CR2 is shunted by a resistor R1 which serves to carry a charging current to the battery 20 when the input voltage V1 is present. Due to the action of the inverter, and as described above, when the input V1 is present, the capacitor C2 is kept charged to a voltage greater than the battery voltage V2, so that charging current flows through the resistor R1 into the battery. The charging current is, of course, determined by the difference of the voltage on C2 and the battery voltage, divided by the resistance of the resistor R1.

It will be appreciated that if it is desirable to maintain a constant charging current in the presence of changes in the battery voltage, and in the presence of changes of the voltage across the capacitor C2, the resistor R1 may be replaced by an active current limiting circuit.

Figure 3:
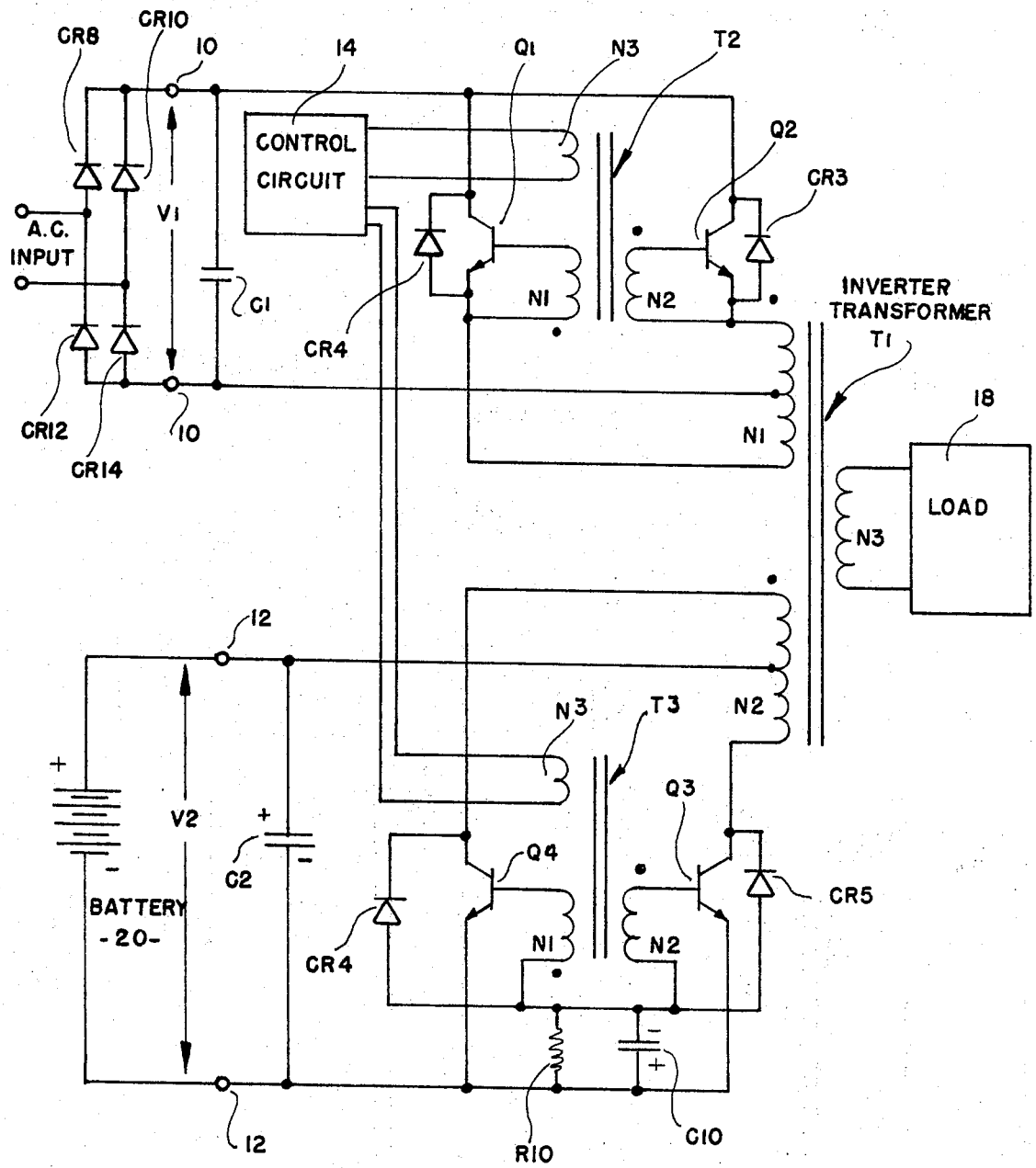
FIG. 3 is an inverter, similar to the inverter of FIG. 2, but slightly modified.

If the battery voltage V2 is low, so that the voltage loss across the diode CR2 in its conductive state, during a time in which the inverter is operating from the battery 20, is a significant fraction of the total battery voltage, it may then be desirable to eliminate the blocking diode CR2, and this is effectuated in the circuit of FIG. 3.

The circuit of FIG. 3 has the same components as the circuit of FIG. 2, and they have been designated by the same numbers. In the circuit of FIG. 3, one of the input terminals 12 is connected to the center tap of the primary winding N2 of the inverter transformer T1, as shown, and the other is connected through a resistor R15 and capacitor C10 to the windings N1 and N2 of the transformer T3. The collectors of the transistors Q3 and Q4 are then connected to the primary winding N2 of the inverter transformer T1 as shown.

In the inverter of FIG. 3, the battery input circuit is connected as a common-emitter network. Now, when the inverter is operating on input V1, the action of the inverter causes a rectified voltage to appear at the negative terminal of the capacitor C10, and this voltage is more negative than the voltage at the negative terminal of the battery and of the capacitor C2. Current therefore flows through the resistor R10 in a direction to charge the battery 20.

When the input falls in the system of FIG. 3, the system operates in the same manner as the previous embodiment, drawing current from the battery 20 through the switching transistors Q3 and Q4. In such an operating mode, the base drive current for the switching transistors flows through the resistor R10.

Now, if for the reasons described above it is desirable to replace the resistor R10 with an active current limiting network, the same current limiting network can be used as a switch to short circuit the capacitor C10 when the input V1 is not present, so that voltage will not be lost in the base drive circuit.

In the circuit of FIG. 3, the switching transistors themselves act as blocking diodes to allow the voltage generated by the primary winding N2 of the inverter transformer T1 to exceed the voltage across the capacitor C2 when the input V1 is active. The circuit must be carefully designed to insure that the difference of the voltage developed by the primary winding N2 of the inverter transformer T1 in this case, and the battery voltage, does not exceed the base-emitter breakdown voltage of the switching transistors. In addition, it may be necessary for the control circuit 14 to supress the transformer drive to the battery input switching transistors Q3 and Q4 when the input V1 is present.

The inverter systems of FIGS. 2 and 3 have utility even without the load winding N3 of the inverter transformer T1. For example, if no such winding is provided in either circuit, and if the output load 18 is connected across the capacitor C1, the inverter has the property that when the input V1 is present, the load current is supplied by that input, and the battery is charged by the inverter system; but if the input V1 fails, the inverter will run on the battery 20 and supply the load current from the winding N1 of the inverter transformer T1, rectified by the diodes CR3 and CR4 associated with that winding.

Figure 4:
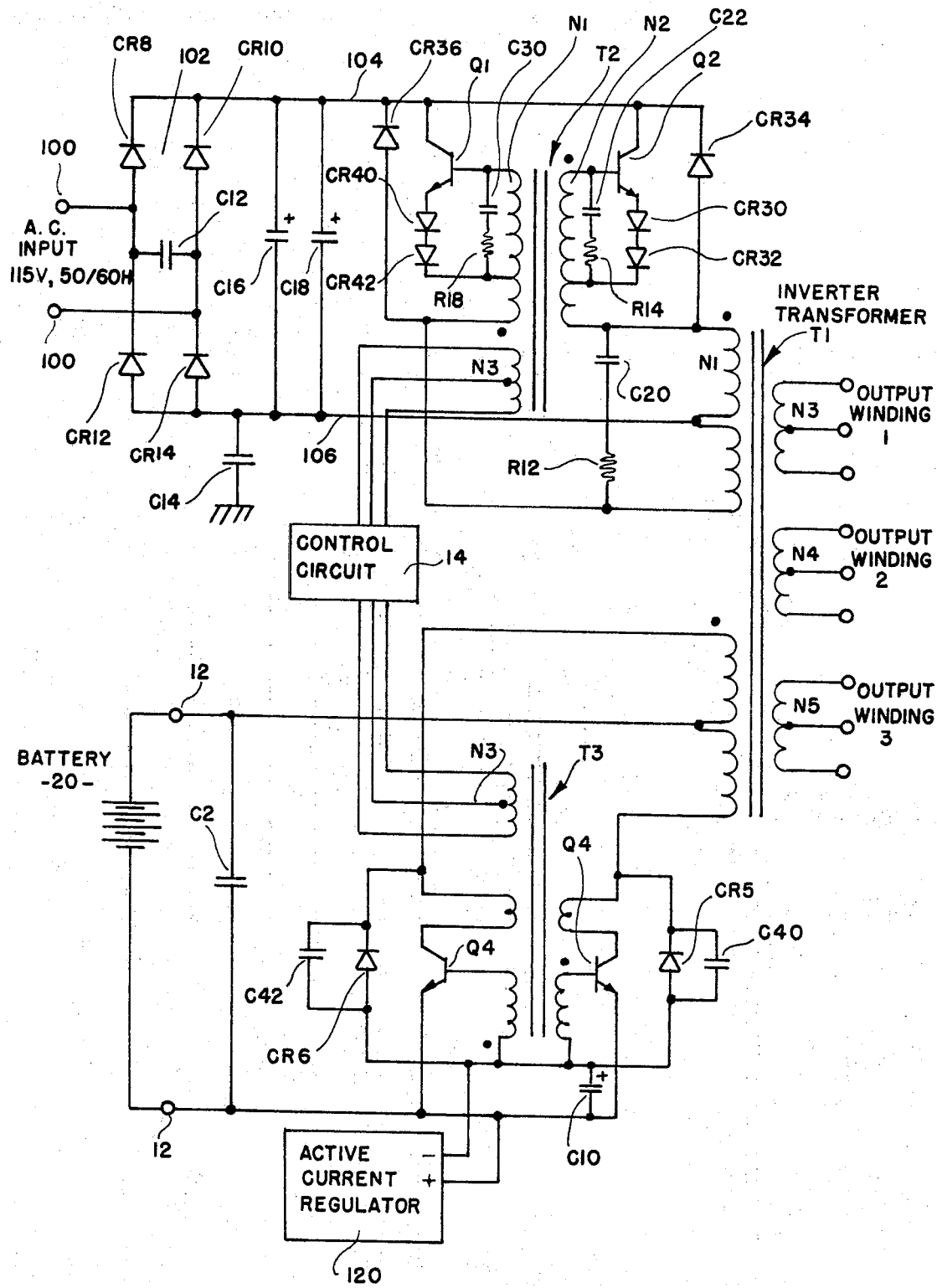
FIG. 4 is a circuit diagram of one commercial embodiment of the inverter of the present invention.

A constructed embodiment of the invention is shown in FIG. 4. In the constructed embodiment of FIG. 4, a pair of input terminals 100 are connected to the usual alternating-current 115-volt 50–60 hertz input power source. The voltage from the power source is rectified by a bridge 102 formed of the diodes CR8, CR10, CR12 and CR14. These diodes may be of the type designated 1N4722. A 0.47 microfarad capacitor C12 is connected across the terminals 100. The rectified output from the bridge rectifier appears across a pair of leads 104 and 106. The lead 106 is connected to a 0.01 microfarad grounded capacitor C14. A pair of 750 microfarad capacitors C16 and C18 are connected in shunt between the leads 104 and 106.

In the constructed embodiment, the inverter transformer T1 is equipped with three secondary windings N3, N4 and N5 which are connected to separate and independent loads. The primary winding N1 of the inverter transformer T1 is shunted by a 0.001 microfarad capacitor C20 and a 100 ohm series resistor R12.

The transistors Q1 and Q2 are of the type designated PP2042. The base of the transistor Q2 is connected to one side of the N2 winding of the transformer T2, the winding being shunted by a 0.0039 microfarad capacitor C22 and a 47 ohm series resistor R14. The emitter of the transistor Q2 is connected through a pair of series connected diodes to the other side of the N2 winding, the diodes being designated CR30 and CR32, and of the type designated 1N4721. The diode CR32 and resistor R14 are actually connected to a tap on the N2 winding, the corresponding side of the winding being connected to the N1 winding of the inverter transformer T1. A diode designated CR34 is connected from the lead 14 to the winding N1 of the transformer T1.

Likewise, a diode CR36, which also may be of the type designated S14 is connected to the other side of the N1 winding of the inverter transformer T1 and to the lead 104. The base of the transistor Q1 is connected to one side of the N1 winding of the transformer T2 and the emitter of the transistor is connected through a pair of diodes CR40 and CR42 to a tap on that winding. Each of the diodes may be of the type designated 1N4721. The base of the transistor is connected to the tap on the winding N1 through a 0.0039 microfarad capacitor C30 and a 47 ohm series resistor R18. The collector of the transistor Q2 and the collector of the transistor Q1 are both connected directly to the lead 104.

In the battery circuit, the capacitor C2 connected across the input terminals 12 has a value of 6,200 microfarads. The transistors Q3 and Q4 are of the type designated MJ3771. The transformer T3 has additional windings in circuit with the respective collectors of the transistors Q3 and Q4, and the diodes CR5 and CR6 are connected across both windings, in each instance. The diodes CR5 and CR6 may be of the type designated 3SF2. Each diode is shunted by a respective capacitor C40 and C42, each of which has a capacity of 0.01 microfarads. The capacitor C10 has a value of 150 microfarads. The resistor R10 of FIG. 3 is replaced by an active current regulator designated 120.

In the circuit of FIG. 4, the diodes CR30, CR32 and CR40, CR42 are biased diodes which provide a reverse voltage to assist in turning off the switching transistors Q1 and Q2. The capacitor C22 and resistor R14, and the capacitor C30 and resistor R18, form networks which prevent undesired ringing of the inverter drive transformer T2. The resistor R12 and capacitor C20 forms a network which prevents voltage overshoot of the inverter transformer winding N1 when the transistors Q1 and Q2 are non-conductive. The capacitors C40 and C42 are connected across the diodes CR5 and CR6 respectively for electrical noise suppression purposes. The capacitor C12 connected across the terminals 100 also serves as a noise suppressor.

The invention provides, therefore, an improved power inverter system which has the capability of switching itself instantaneously and without loss of output power, from a main power source to an auxiliary power source, should the main source fail.

While particular embodiments of the invention have been shown and described, modifications may be made, and it is intended to cover all such modifications in the appended claims which come within the spirit and scope of the invention.

What is claimed is:

1. An inverter power supply circuit including: a transformer having a first primary winding with N1 turns and a second primary winding with N2 turns; a first input circuit connected to said first primary winding for providing power to said first primary winding from a first power source of voltage V1; a second input circuit connected to said second primary winding for providing power to said second primary winding from a second power source of voltage V2; and in which the turns ratio N1/N2 of said first and second primary windings is slightly less than the voltage ratio V1/V2 of said first and second power sources; and current blocking means included in said second input circuit to prevent current from being drawn from said second source as long as the voltage V2 is less than the voltage V1.

2. The inverter power supply circuit defined in claim 1, in which said current blocking means is a diode.

3. The inverter power supply circuit defined in claim 1, in which said transformer has at least one secondary winding, and a load connected to said secondary winding.

4. The inverter power supply circuit defined in claim 1, and which includes a first pair of switching transistors connected to said first primary winding, and a second pair of switching transistors connected to said second primary winding, a second transformer intercoupling said switching transistors of said first pair, a second transformer intercoupling said switching transistors of said second pair, and a common control circuit synchronously driving the switching transistors of said first and second pairs.

5. The inverter power supply circuit defined in claim 4, and which includes first shunt filter capacitor means connected in said first input circuit, and a second shunt filter capacitor means connected in said second output circuit.

6. The inverter power supply circuit defined in claim 5, in which said first source is an alternating-current power source, and said second source is a direct-current power source.

7. The inverter power supply circuit defined in claim 1, in which said first source is an alternating-current source, and said second source is a direct-current battery, and which includes a charging network for the battery connected in said input circuit for charging the battery when the first source is active.

8. The inverter circuit defined in claim 7, in which said current blocking means is a diode, and in which said charging network comprises a resistor connected across said diode.

9. The inverter circuit defined in claim 7, in which said charging network comprises a capacitor connected in said second input circuit, and a resistor shunting said capacitor.

10. The inverter power supply circuit defined in claim 7, in which said charging network comprises a capacitor connected in said second input circuit, and an active current regulator shunted across said capacitor.

\* \* \* \* \*